(12) United States Patent
Huang et al.

(10) Patent No.: US 10,199,942 B2
(45) Date of Patent: Feb. 5, 2019

(54) CONTROLLER AND POWER SUPPLY

(71) Applicant: Leadtrend Technology Corp., Hsinchu County (TW)

(72) Inventors: Kuo-Chien Huang, Hsinchu County (TW); Ren-Yi Chen, Hsinchu County (TW)

(73) Assignee: Leadtrend Technology Corp., Hsinchu County (TW)

( * ) Notice: Subject to any disclaimer, the term of this patent is extended or adjusted under 35 U.S.C. 154(b) by 7 days.

(21) Appl. No.: 15/652,257

(22) Filed: Jul. 18, 2017

(65) Prior Publication Data

US 2017/0317593 A1   Nov. 2, 2017

Related U.S. Application Data

(63) Continuation of application No. 14/538,813, filed on Nov. 12, 2014, now Pat. No. 9,735,684, which is a continuation of application No. 13/297,268, filed on Nov. 16, 2011, now Pat. No. 8,913,360.

(30) Foreign Application Priority Data

Nov. 17, 2010 (CN) .......................... 2010 1 0554671

(51) Int. Cl.
*H02M 3/24* (2006.01)
*H02M 3/335* (2006.01)
*H02M 1/00* (2006.01)

(52) U.S. Cl.
CPC ......... *H02M 3/24* (2013.01); *H02M 3/33507* (2013.01); *H02M 2001/0009* (2013.01)

(58) Field of Classification Search
CPC ........................... H02M 3/24; H02M 3/33507
USPC ......................................................... 361/91.1
See application file for complete search history.

(56) References Cited

U.S. PATENT DOCUMENTS

| 5,495,149 | A | 2/1996 | Hiramatsu |
| 7,133,300 | B1 | 11/2006 | Yang |
| 7,208,884 | B2 | 4/2007 | Bao |
| 7,907,425 | B2 | 3/2011 | Lin |
| 8,427,802 | B2 | 4/2013 | Yoshizawa |
| 2005/0162872 | A1 | 7/2005 | Hirabayashi |
| 2006/0056204 | A1* | 3/2006 | Yang ................. H02M 3/33507 363/10 |
| 2006/0109697 | A1 | 5/2006 | Kazuma |
| 2007/0159856 | A1* | 7/2007 | Yang ...................... H02M 1/44 363/21.12 |

(Continued)

FOREIGN PATENT DOCUMENTS

| CN | 100409136 C | 8/2008 |
| TW | 516261 | 1/2003 |

(Continued)

*Primary Examiner* — Dharti H Patel
(74) *Attorney, Agent, or Firm* — Winston Hsu (57) ABSTRACT

Power supplies together with related over voltage protection methods and apparatuses. A power supply has a transformer including a primary winding and an auxiliary winding. A power switch is coupled to the primary winding and a sensing resistor coupled between the power switch and a grounding line. A multi-function terminal of a controller is coupled to the sensing resistor. A diode and a first resistor is coupled between the auxiliary winding and the multi-function terminal.

7 Claims, 7 Drawing Sheets

(56) References Cited

U.S. PATENT DOCUMENTS

| | | | | |
|---|---|---|---|---|
| 2011/0012554 A1* | 1/2011 | Lin | ....................... | H02J 7/0052 320/107 |
| 2011/0266969 A1* | 11/2011 | Ludorf | ................ | H02M 1/4258 315/294 |
| 2012/0013321 A1* | 1/2012 | Huang | .............. | H02M 3/33523 323/282 |
| 2012/0056551 A1* | 3/2012 | Zhu | .................... | H02M 1/4258 315/232 |
| 2012/0224397 A1* | 9/2012 | Yeh | .................. | H02M 3/33507 363/21.12 |
| 2012/0300608 A1* | 11/2012 | Masumura | ......... | G01N 21/4795 369/103 |
| 2012/0320632 A1* | 12/2012 | Kalodka | ........... | H02M 3/33507 363/16 |

FOREIGN PATENT DOCUMENTS

| | | |
|---|---|---|
| TW | 200824240 | 6/2008 |
| TW | 200919923 | 5/2009 |
| TW | I317199 | 11/2009 |
| TW | 201009532 | 3/2010 |

* cited by examiner

FIG. 8

CONTROLLER AND POWER SUPPLY

CROSS REFERENCE TO RELATED APPLICATIONS

This application is a continuation application of U.S. patent application Ser. No. 14/538,813, filed on Nov. 12, 2014, which is a continuation of U.S. patent application Ser. No. 13/297,268, filed on Nov. 16, 2011, and all benefits of such earlier application are hereby claimed for this new continuation application

BACKGROUND OF THE INVENTION

1. Field of the Invention

The present invention relates to a protection circuit of a power supply.

2. Description of the Prior Art

Switching mode power supplies (SMPS), which control on and off states of a power switch to store and release energy in an inducting unit to provide required power to a load, make up the majority of power supplies due to conversion efficiency and product size thereof.

Figure 1:
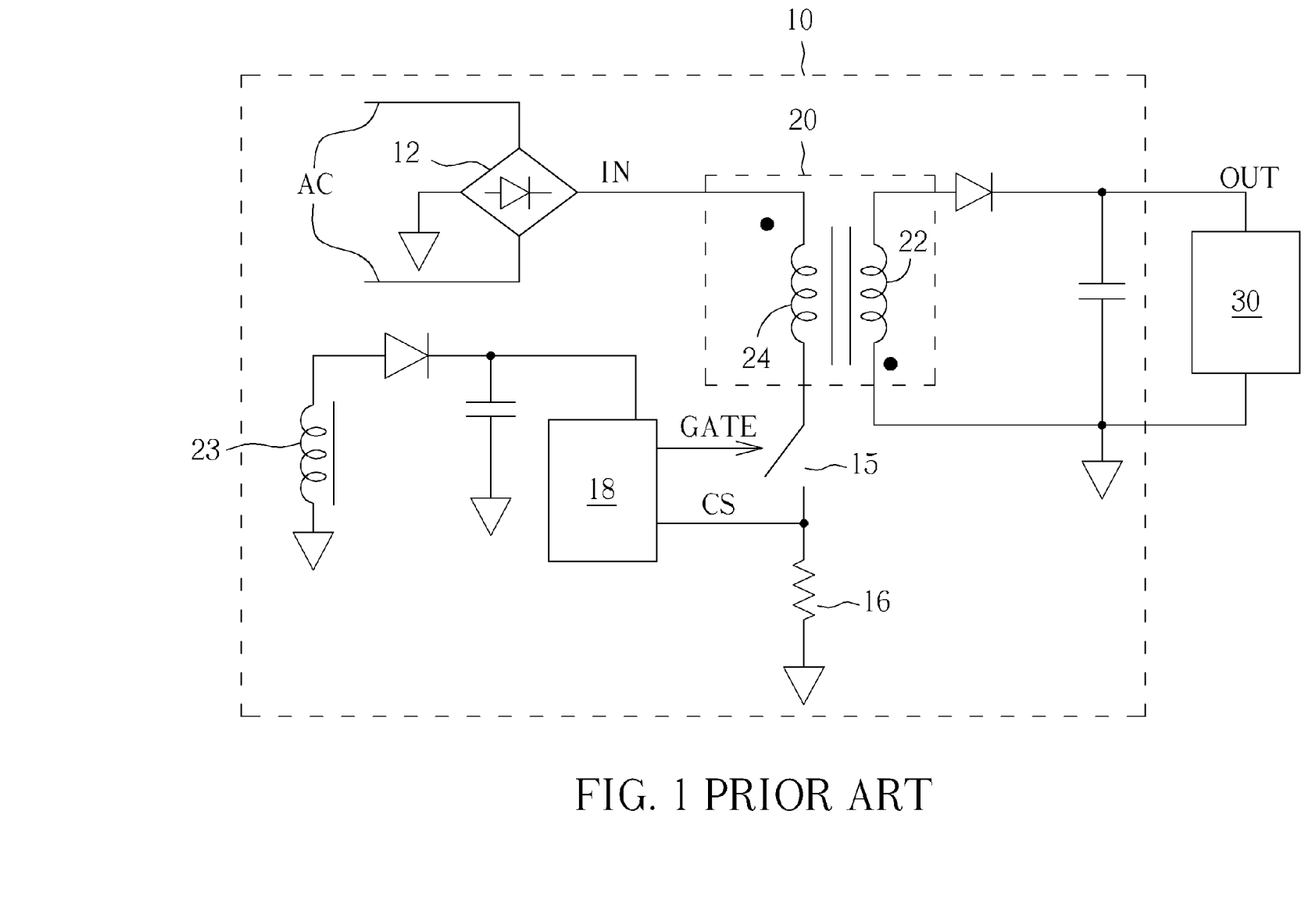
FIG. 1 is a diagram showing a switching mode power supply (SMPS) of the prior art.

For example, FIG. 1 is a diagram showing a SMPS 10 with a flyback structure. A bridge rectifier 12 rectifies AC power to provide DC power VIN, which may be as high as 100 Volts to 300 Volts, at an IN end. A controller 18 detects a detection signal VCS across a current sensing resistor 16 via a CS end. The detection signal VCS is a voltage signal corresponding to an induction current through a primary winding 24 of a transformer 20 when a power switch 15 is turned on. The controller 18 increases or decreases the induction current by controlling on and off states of the power switch 15 via a GATE end. A secondary winding 22 provides output power VOUT to a load 30. An auxiliary winding 23 provides operating power VCC to the controller 18.

Most switching mode power supplies need a protection mechanism to prevent abnormal conditions. A common protection mechanism is called over voltage protection, which turns off the power switch for a period of time when the output voltage VOUT is too high.

Figure 2:
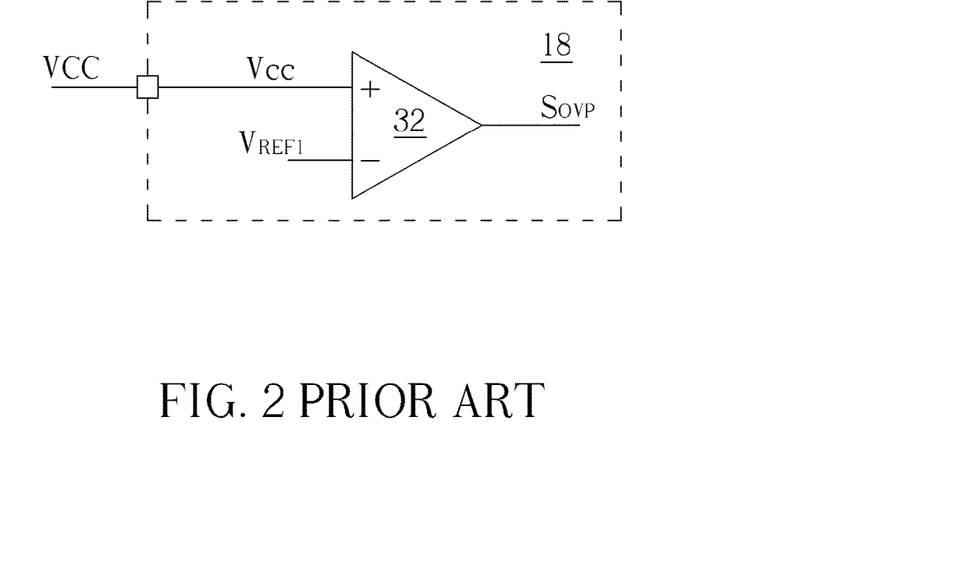
FIG. 2 and FIG. 3 are diagrams showing over voltage protection mechanisms.

FIG. 2 is a diagram showing an over voltage protection mechanism. In FIG. 2, an over voltage protection circuit is arranged in the controller 18. If a comparator 32 determines a voltage of the operating power VCC exceeds a reference voltage VREF1, the over voltage protection is triggered. However, the voltage of the operating power VCC may not correctly correspond to the output power voltage VOUT due to inductor leakage. Therefore, the protection mechanism of FIG. 2 is not proper.

Figure 3:
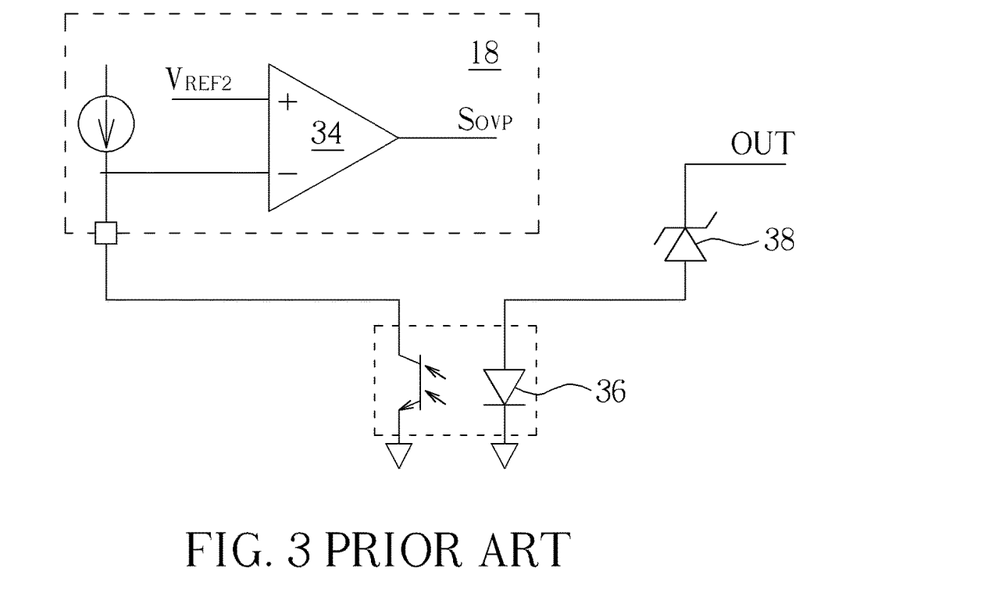

FIG. 3 is a diagram showing another over voltage protection mechanism. When the output power voltage VCC exceeds a predetermined voltage of a Zener diode 38, a photo-coupler 36 pulls down a voltage at an input end of a comparator 34 to trigger an over voltage signal SOVP. However, the protection mechanism of FIG. 3 needs the additional Zener diode 38 and photo-coupler 36, which increases cost and product size.

SUMMARY OF THE INVENTION

An embodiment of the present invention provides a power supply. The power supply includes a transformer, a power switch, a sensing resistor, a controller, and a diode and a first resistor. The transformer has a primary winding and an auxiliary winding. The power switch is coupled to the primary winding. The sensing resistor has a first terminal coupled to a grounding line and a second terminal coupled to the power switch. The controller has a multi-function terminal coupled to the sensing resistor. The diode and the first resistor are coupled between the auxiliary winding and the multi-function terminal. When the power switch is turned on, the controller through the multi-function terminal detects a current through the power switch, and when the power switch is turned off, the controller detects a voltage of the multi-function terminal, and determines to trigger a protection mechanism if the voltage of the multi-function terminal is over a reference voltage.

Another embodiment of the present invention provides a controller for controlling a power switch of a power supply. The controller includes a multi-function terminal, a protection detecting circuit, and a gate controller. The multi-function terminal is coupled to the power switch and used for detecting a current through the power switch. The protection detecting circuit is used for detecting and comparing a voltage of the multi-function terminal with a reference voltage when the power switch is turned off, and triggering a protection signal if the voltage of the multi-function terminal is over a reference voltage. The gate controller is coupled to the power switch and used to turning on and turning off the power switch. If the protection mechanism is triggered, the power switch will be turned off.

These and other objectives of the present invention will no doubt become obvious to those of ordinary skill in the art after reading the following detailed description of the preferred embodiment that is illustrated in the various figures and drawings.

DETAILED DESCRIPTION

Figure 4:
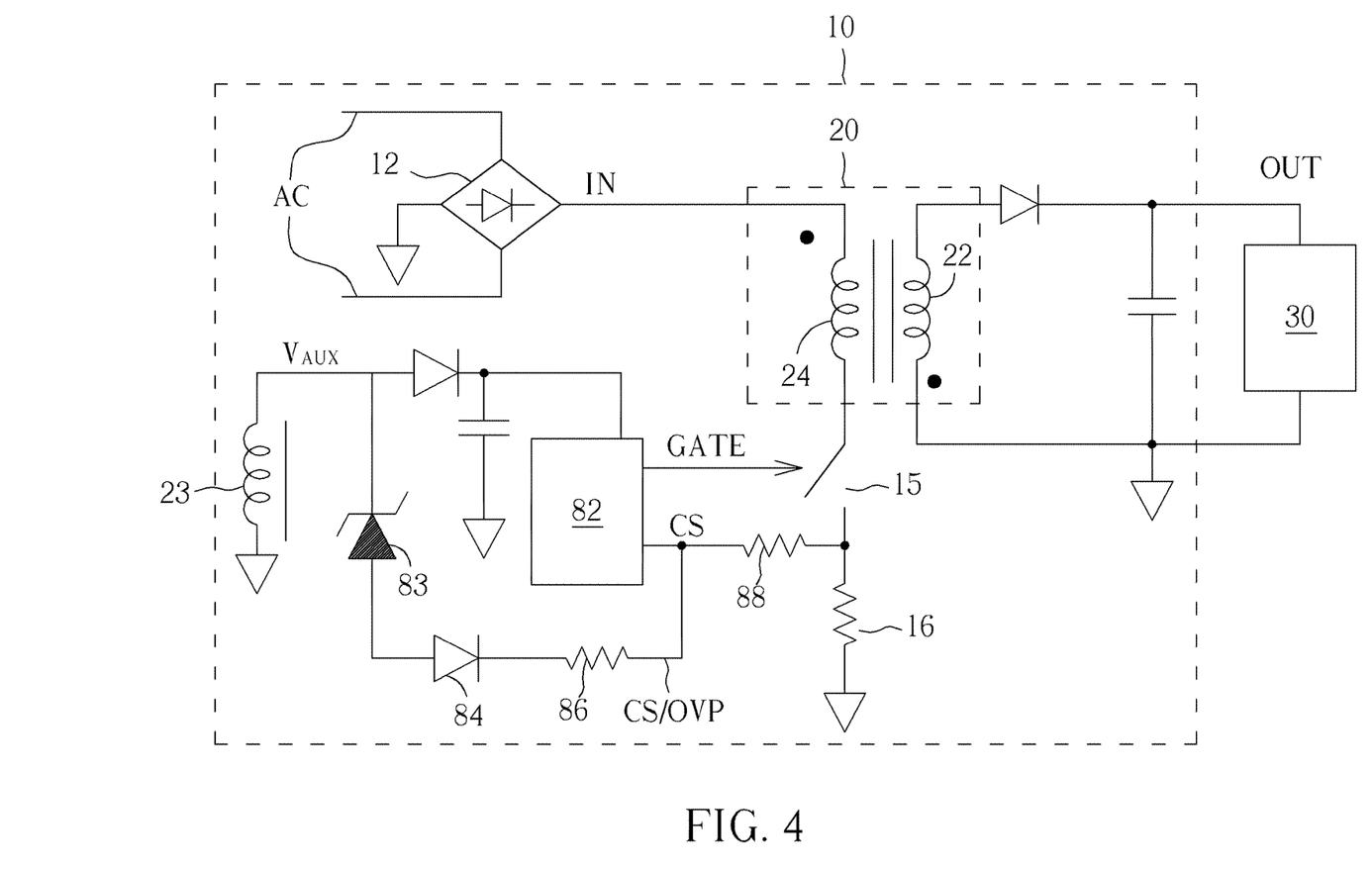
FIG. 4 is a diagram showing a switching mode power supply (SMPS) of the present invention.

FIG. 4 is a diagram showing a switching mode power supply 80 (SMPS 80) of the present invention. Different from the SMPS 10 of FIG. 1, the SMPS 80 comprises a Zener diode 83, a diode 84, resistors 86 and 88, and a controller 82.

The controller 82 can be a single chip integrated circuit with a multi-function terminal CS/OVP. The Zener diode 83, the diode 84, and the resistor 86 are serially coupled between an auxiliary winding 23 and the multi-function terminal CS/OVP. The resistor 88 is coupled between the multi-function terminal CS/OVP and a current sensing resistor 16. The multi-function terminal CS/OVP has at least two functions: (a) current detection, and (b) over voltage protection.

When the controller 82 enables a gate signal $V_{GATE}$ to turn on a power switch 15 via a GATE end, a voltage $V_{CS}$ of the multi-function terminal CS/OVP corresponds to a current through the power switch 15. And, the controller 82 determines when to disable the gate signal $V_{GATE}$ to turn off the power switch 15 according to the voltage $V_{CS}$ of the multi-function terminal CS/OVP.

After the power switch 15 is turned off, a voltage $V_{AUX}$ of the auxiliary winding 23 approximately corresponds to a voltage of a secondary winding as well as an output power voltage $V_{OUT}$. If the voltage $V_{AUX}$ is lower than a predetermined voltage of the Zener diode 83 and the diode 84, the voltage $V_{CS}$ of the multi-function terminal CS/OVP is around 0 Volts. If the voltage $V_{AUX}$ is higher than the predetermined voltage, the voltage $V_{CS}$ of the multi-function terminal CS/OVP is greater than 0 Volts. In order to prevent inaccuracies caused by inductor leakage, the controller 82 compares the voltage $V_{CS}$ with a reference voltage after the power switch 15 is turned off for a period of delay time. If the voltage $V_{CS}$ is higher than the reference voltage, an over voltage signal will be triggered, which indicates that the output power voltage $V_{OUT}$ exceeds a corresponding value of the predetermined voltage of the Zener diode 83 and the diode 84.

Figure 5:
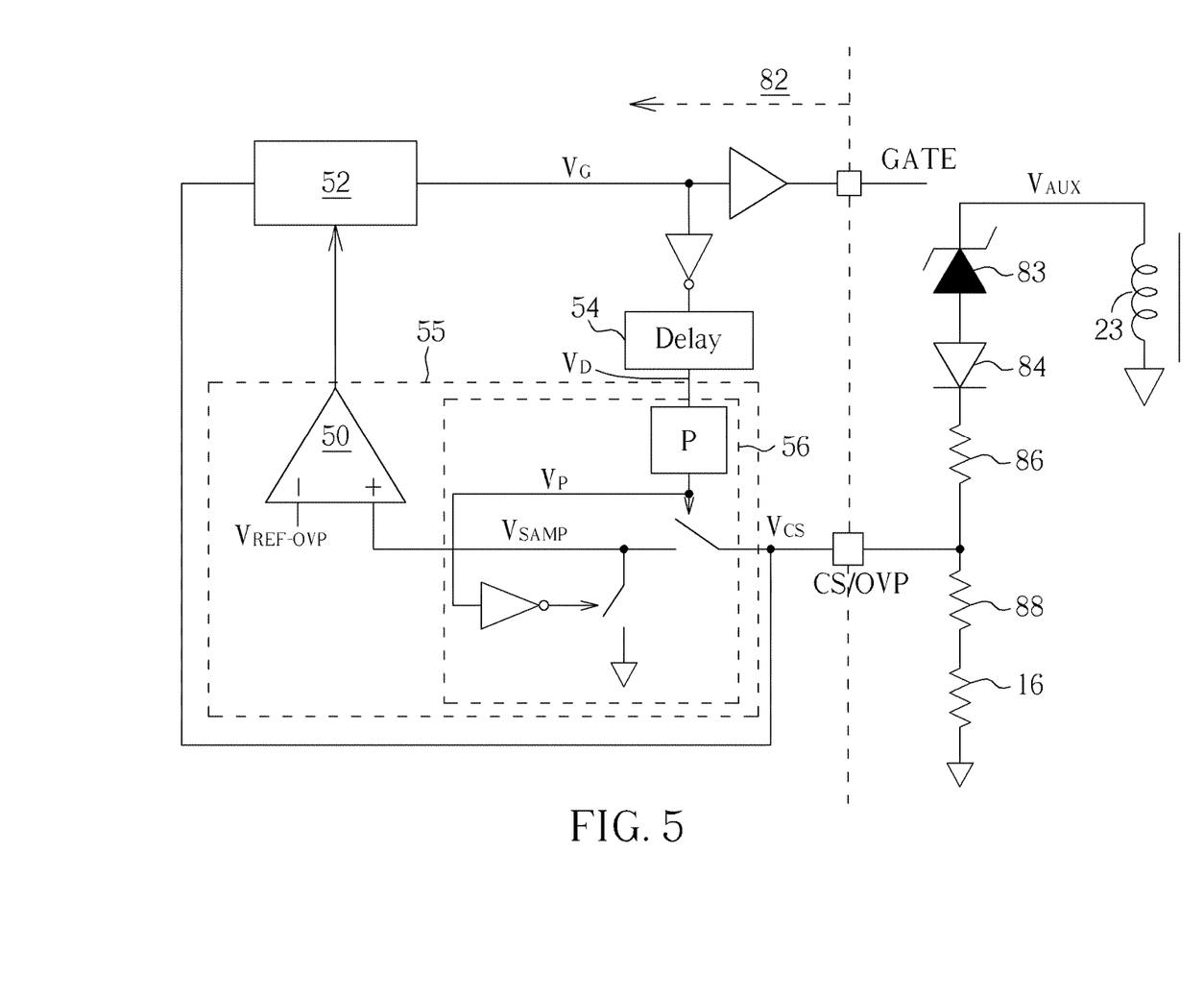
FIG. 5 is a diagram showing part of a controller and components besides the controller.
Figure 6:
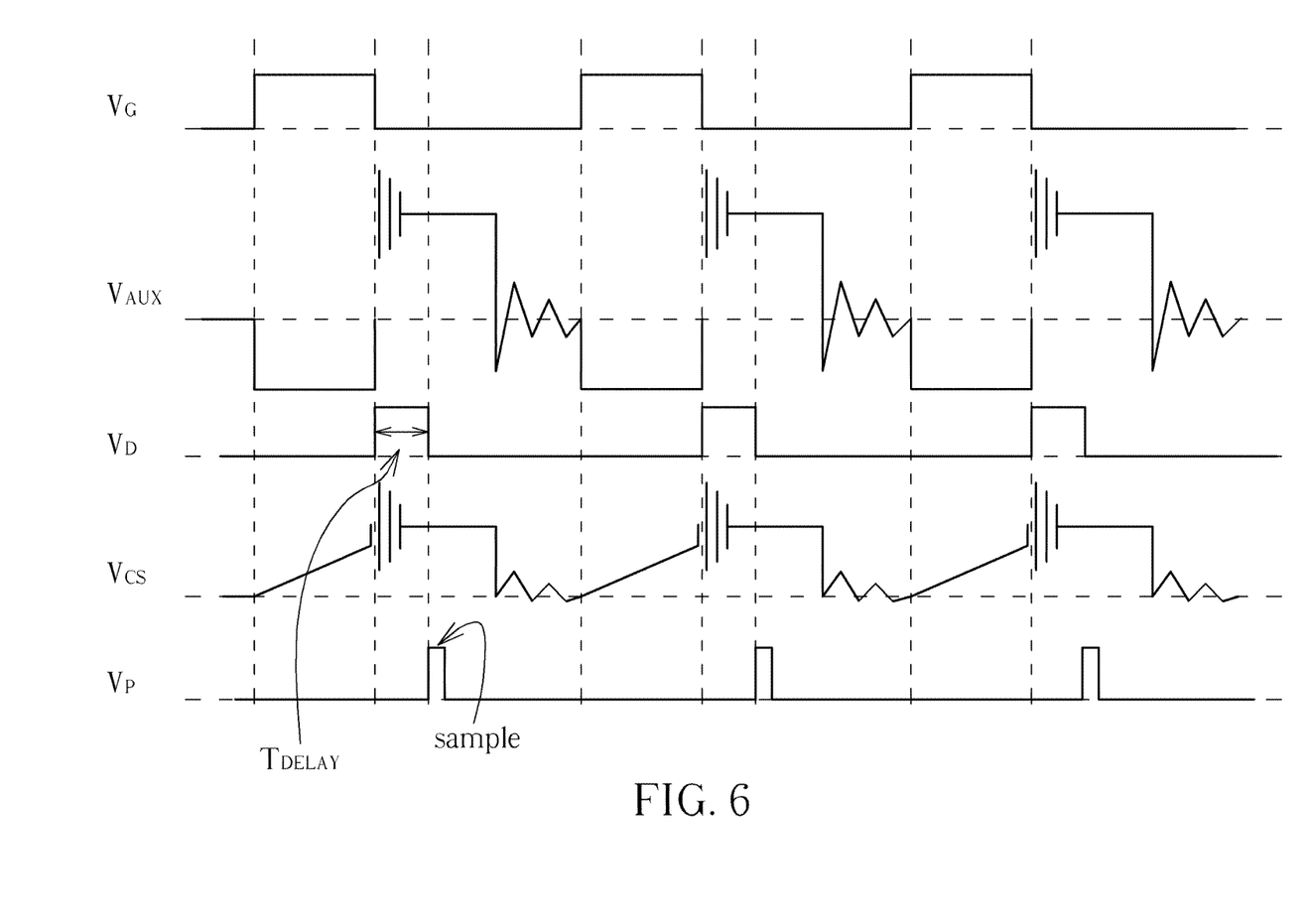
FIG. 6 is a diagram showing waveforms of signals of FIG. 5.

FIG. 5 is a diagram showing part of the controller 82 and components other than the controller 82. FIG. 6 is a diagram showing waveforms of signals of FIG. 5. The controller 82 comprises a delay time generator 54, an over voltage detection circuit 55, and a gate controller 52. The over voltage detection circuit 55 comprises a sampler 56 and a comparator 50.

When a signal $V_G$ is logic "1", the gate signal $V_{GATE}$ is logic "1" as well to turn on the power switch 15. The voltage $V_{AUX}$ of the auxiliary winding 23 is negative. Since the voltage $V_{AUX}$ is blocked by the diode 84, the voltage $V_{CS}$ of the multi-function terminal CS/OVP will not be affected. Therefore, a current through the power switch 15 is increased, such that the voltage $V_{CS}$ increases as shown in FIG. 6.

When the voltage $V_{CS}$ reaches a certain level, the gate controller 52 switches the signal $V_G$ to be logic "0" for turning off the power switch 15. Once the power switch 15 is turned off, the voltage $V_{AUX}$ of the auxiliary winding 23 will oscillate for a period of time and then settle to a positive value proportional to the output power voltage $V_{OUT}$. The delay time generator 54 provides a delay time $T_{DELAY}$ after the power switch 15 is turned off. The delay time $T_{DELAY}$ is for preventing inaccuracies caused by the oscillation of the voltage $V_{AUX}$. After the delay time $T_{DELAY}$, the sampler 56 transmits a short pulse signal $V_P$ for sampling the voltage of the multi-function terminal CS/OVP to generate a sampling signal $V_{SAMP}$. When the short pulse signal $V_P$ is logic "0", the sampling signal $V_{SAMP}$ is coupled to ground to be fixed at 0 Volts. When the short pulse signal $V_P$ is logic "1", the sampling signal $V_{SAMP}$ is equal to the voltage $V_{CS}$. As mentioned above, if the output power voltage $V_{OUT}$ is high, the voltage $V_{AUX}$ of the auxiliary winding 23 is high as well. If the voltage $V_{AUX}$ of the auxiliary winding 23 is high enough to break down the Zener diode 83, the sampling signal $V_{SAMP}$ will be higher than a reference voltage $V_{REF-OVP}$, such that the comparator 50 triggers an over voltage signal $S_{OVP}$. For example, the triggered over voltage signal $S_{OVP}$ can make the gate controller 52 keep the signal $V_G$ at logic "0" through several on-off cycles.

Figure 7:
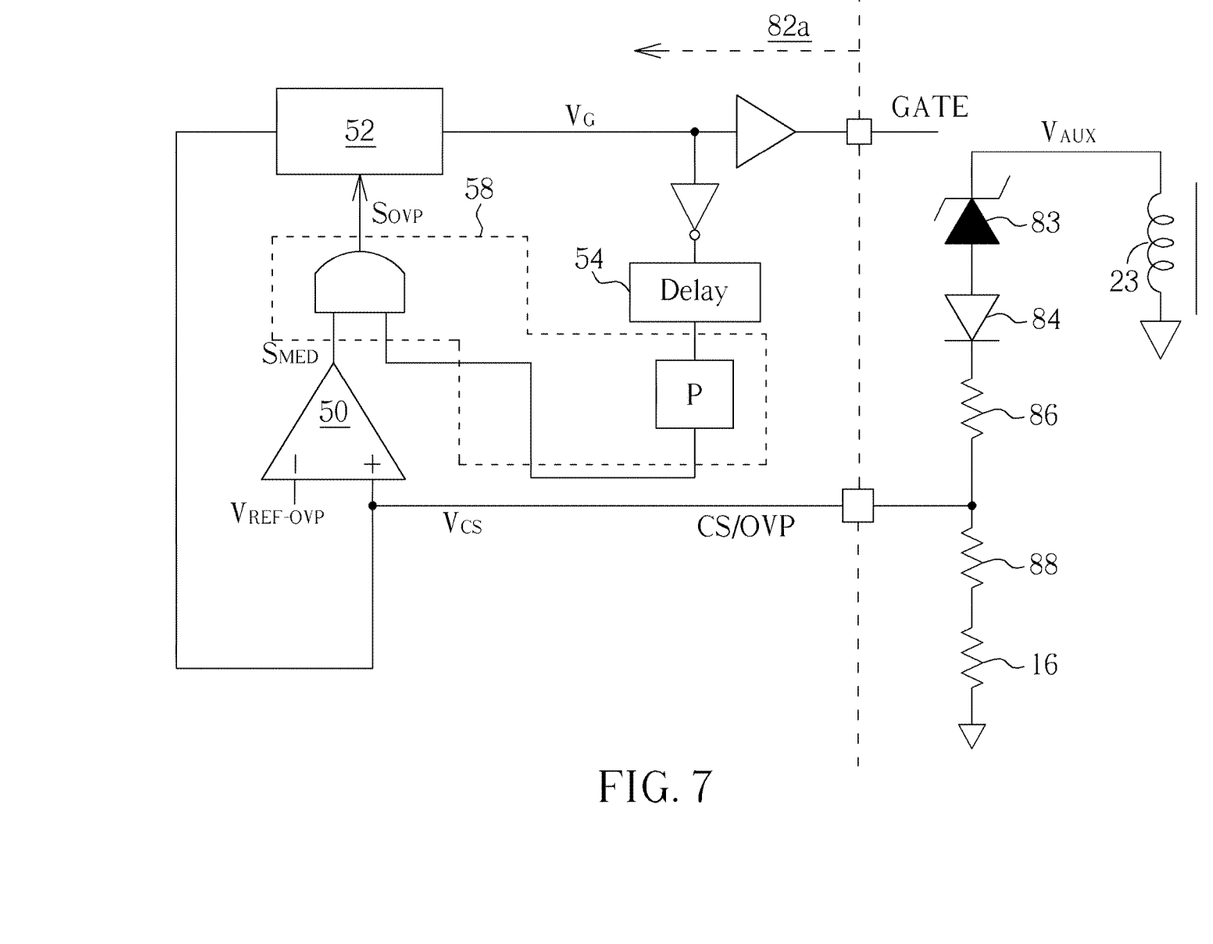
FIG. 7 is another embodiment showing part of a controller and components besides the controller.

FIG. 7 is another embodiment showing part of a controller 82a and components other than the controller 82a. FIG. 6 can also be a diagram showing waveforms of signals of FIG. 7. In FIG. 7, the comparator 50 and a blocking unit 58 can be utilized as an over voltage detection circuit. As shown in FIG. 7, the comparator 50 compares the voltage of the multi-function terminal CS/OVP with the reference voltage $V_{REF-OVP}$ in order to trigger a relay signal $S_{MED}$. Most of the time, the relay signal $S_{MED}$ is blocked by an AND gate of the blocking unit 58. A logic level of the relay signal $S_{MED}$ will be passed as a logic level of the over voltage signal $S_{OVP}$ only when the short pulse signal $V_P$ of the blocking unit 58 is logic "1". Please refer to the illustration of FIG. 5 for description of other operation principles of the embodiments of FIG. 7. Further illustrations are provided herein.

Figure 8:
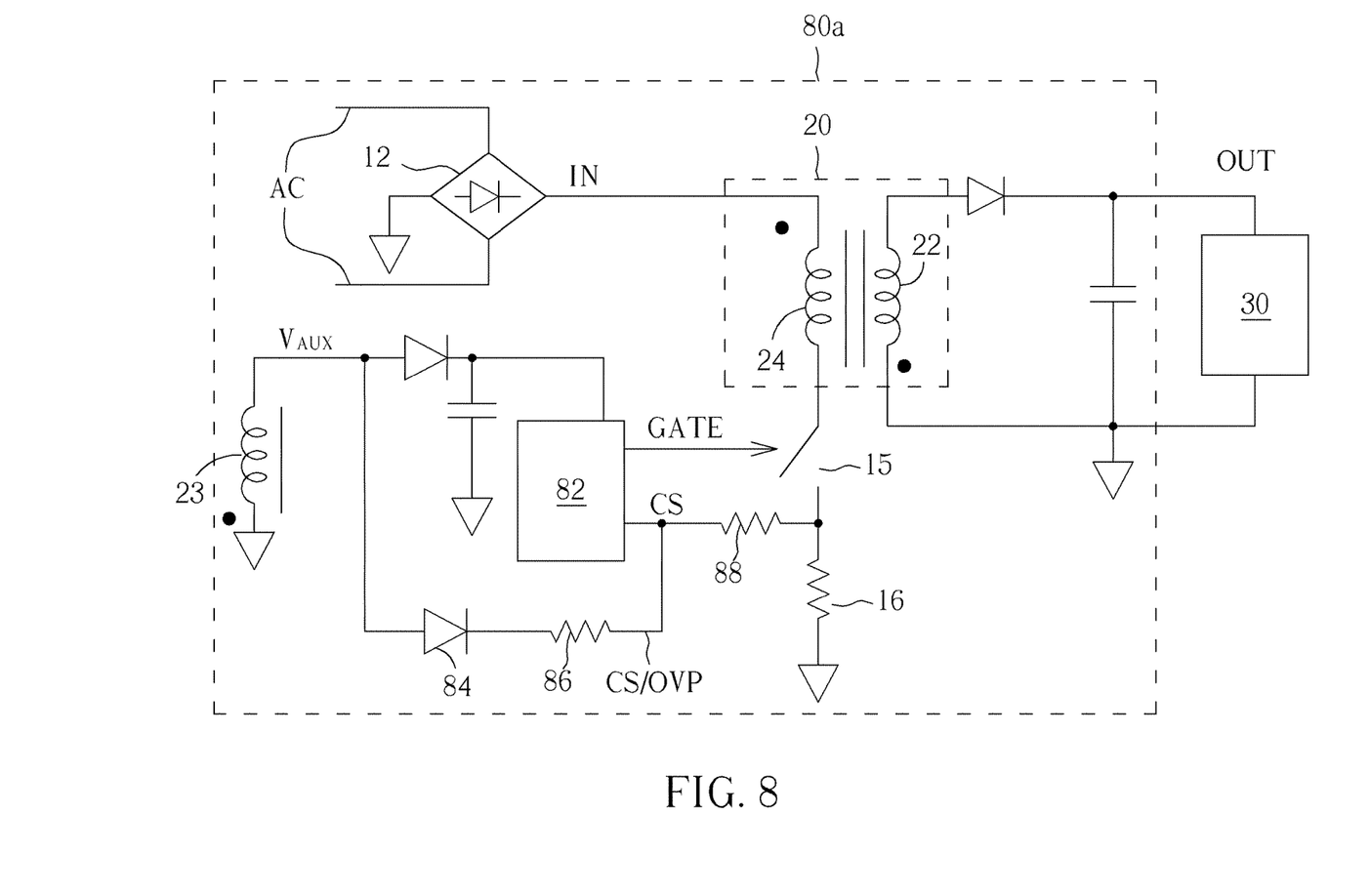
FIG. 8 is a diagram showing another switching mode power supply (SMPS) of the present invention.

FIG. 8 is a diagram showing another switching mode power supply (SMPS) 80a of the present invention. Different from the SMPS 80 of FIG. 4, the SMPS 80a does not comprise the Zener diode 83.

As shown in FIG. 8, after the power switch 15 is turned off, the voltage $V_{CS}$ of the multi-function terminal CS/OVP approximately corresponds to the voltage $V_{AUX}$ of the auxiliary winding 23 as well as the output power voltage $V_{OUT}$. Therefore, the controller 82 compares the voltage $V_{CS}$ with a reference voltage after the power switch 15 is turned off for a period of delay time. If the voltage $V_{CS}$ is higher than the reference voltage, an over voltage signal will be triggered, which indicates that the output power voltage $V_{OUT}$ exceeds a corresponding value of the reference voltage. Internal structure of the controller 82 of FIG. 8 can be implemented according to the circuits of FIG. 5 and FIG. 7, or other equivalent circuits.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power supply, comprising:
   a transformer, having a primary winding and an auxiliary winding;
   a power switch coupled to the primary winding;
   a sensing resistor, having a first terminal coupled to a grounding line and a second terminal coupled to the power switch;
   a controller, having a multi-function terminal coupled to the sensing resistor; and
   a diode and a first resistor, coupled between the auxiliary winding and the multi-function terminal;
   wherein, when the power switch is turned on, the controller through the multi-function terminal detects a current through the power switch, and when the power switch is turned off, the controller detects a voltage of the multi-function terminal, and determines to trigger a protection mechanism if the voltage of the multi-function terminal is over a reference voltage.

2. The power supply of claim 1, wherein the controller delays to trigger the protection mechanism for a delay time if the voltage of the multi-function terminal overs a reference voltage.

3. The power supply of claim 1, further comprising a second resistor coupled between the sensing resistor and the multi-function terminal.

4. A controller for controlling a power switch of a power supply, the controller comprising:
   a multi-function terminal, coupled to the power switch, used for detecting a current through the power switch;
   a protection detecting circuit, used for detecting and comparing a voltage of the multi-function terminal with a reference voltage when the power switch is turned off, and triggering a protection signal if the voltage of the multi-function terminal is over a reference voltage; and a gate controller, coupled to the power switch, used to turning on and turning off the power switch;

wherein, if the protection mechanism is triggered, the power switch will be turned off.

5. The controller of claim 4, wherein the protection signal is triggered after a delay time if the voltage of the multi-function terminal is over a reference voltage.

6. The controller of claim 5, wherein the protection detection circuit comprises:

a sampler for sampling the voltage of the multi-function terminal after the delay time and generating a sampling signal; and a comparator for comparing the sampling signal with the reference voltage.

7. The controller of claim 5, wherein the protection detection circuit comprises:

a comparator for comparing the voltage of the multi-function terminal with the reference voltage and triggering a relay signal if the voltage of the multi-function terminal is over the reference voltage; and a blocking unit, used to blocking the relay signal for a predetermined time;

wherein, the relay signal is used as the protection signal after the predetermined time.

\* \* \* \* \*